United States Patent
Klein

(10) Patent No.: US 8,498,088 B1
(45) Date of Patent: Jul. 30, 2013

(54) STORAGE DEVICE WITH REPLACEABLE PROTECTION DEVICE

(75) Inventor: Barry L. Klein, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/333,985

(22) Filed: Dec. 21, 2011

(51) Int. Cl.
*H02H 3/22* (2006.01)
*H02H 3/20* (2006.01)
*H02H 9/04* (2006.01)

(52) U.S. Cl.
USPC .......................................... 361/111; 361/91.1

(58) Field of Classification Search
USPC ................................................. 361/91.1, 111
See application file for complete search history.

(56) References Cited

U.S. PATENT DOCUMENTS

| | | | |
|---|---|---|---|
| 5,587,685 A | 12/1996 | Johansson | |
| 5,930,096 A | 7/1999 | Kim | |
| 6,473,283 B1 | 10/2002 | Melvin et al. | |
| 6,866,527 B2 | 3/2005 | Potega | |
| 7,154,725 B2 | 12/2006 | Chloupek et al. | |
| 7,167,040 B2 | 1/2007 | Takagi et al. | |
| 7,623,332 B2 | 11/2009 | Frank et al. | |
| 7,649,726 B2 | 1/2010 | Castro | |
| 2006/0120005 A1 | 6/2006 | Van Sickle | |
| 2009/0207034 A1* | 8/2009 | Tinaphong et al. | 340/635 |
| 2009/0268356 A1 | 10/2009 | Mollema et al. | |
| 2010/0219916 A1* | 9/2010 | Meltzner | 335/39 |
| 2011/0133655 A1* | 6/2011 | Recker et al. | 315/159 |

* cited by examiner

*Primary Examiner* — Dharti Patel

(57) ABSTRACT

The present invention relates to an external storage device, such as a hard disk drive, having a replaceable protection device. In one embodiment, the storage device comprises an overvoltage protection device coupled in parallel with a power adapter. The protection device may be configured to fail in short circuit in the event of an overvoltage condition. In order to make the protection device readily replaceable, it may be located on the storage device such that it is accessible by a user. The storage device is configured to continue operations if the protection device is removed.

21 Claims, 4 Drawing Sheets

STORAGE DEVICE WITH REPLACEABLE PROTECTION DEVICE

BACKGROUND

Electronic devices, such as data storage devices, computers, etc., comprise sensitive electrical circuits. Electrical transients caused by power surges, electrostatic discharge, and the like can damage these circuits.

Transient voltage suppression (TVS) diodes have been commonly used to protect these sensitive circuits in power adapters for electronic devices. Unfortunately, however, TVSDs often fail as short circuits in response to a transient and will render the power adapter unusable. This leads to either the product or the power adapter having to be replaced.

BRIEF DESCRIPTION OF THE DRAWINGS

Systems and methods which embody the various features of the invention will now be described with reference to the following drawings, in which.

DETAILED DESCRIPTION

The embodiments provide a transient protection device for protecting a device, such as a data storage device. In the embodiments, the transient protection device may be a TVS diode that is connected in parallel with the device and its power input. Furthermore, the TVS diode is provided in a replaceable or removable form at an accessible location on the power adapter for the load or on the casing of the load itself.

Figure 1:
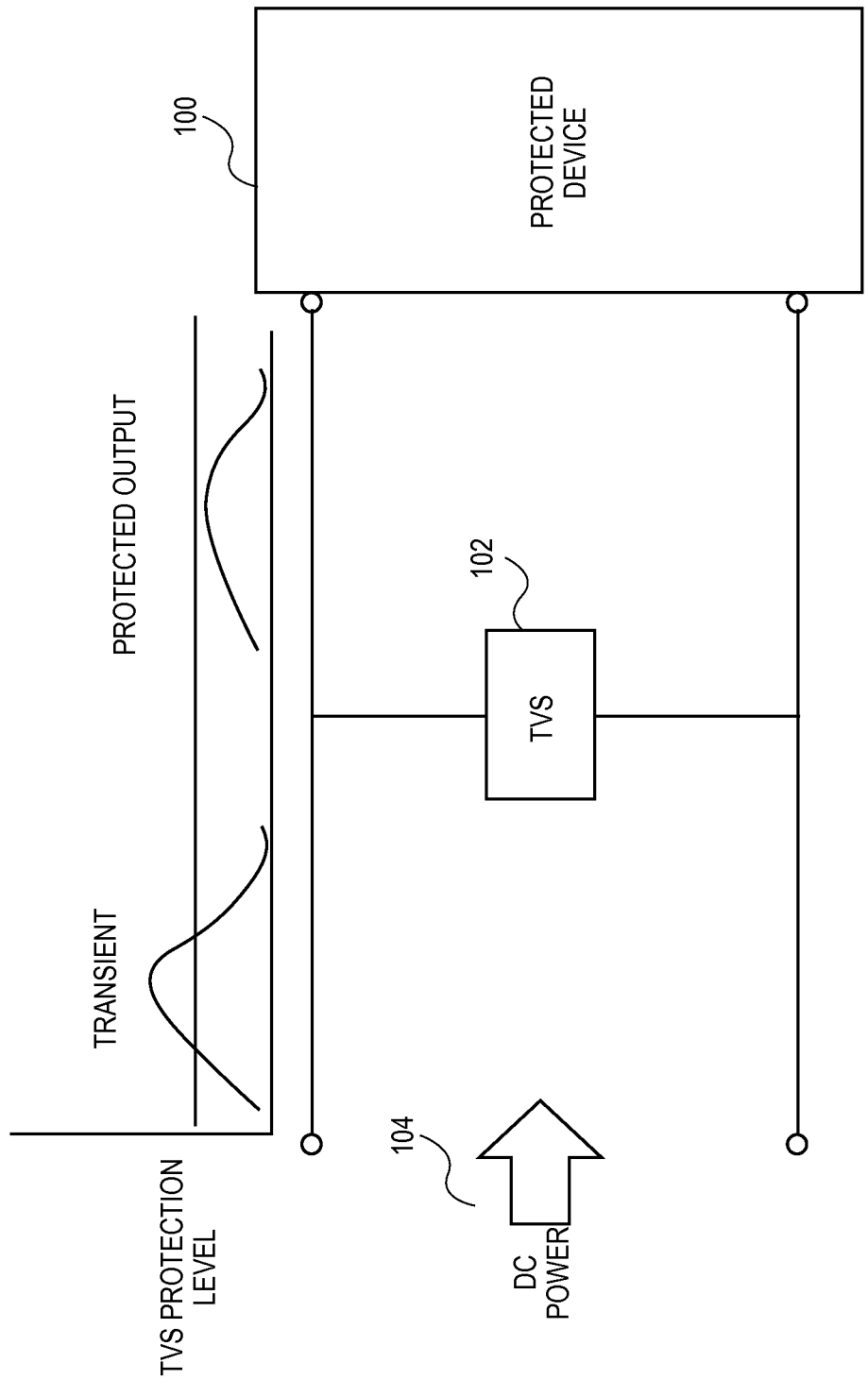
FIG. 1 conceptually shows a protection device, such as a TVS diode, protecting a protected device from a transient.

FIG. 1 conceptually shows a protection device, such as a TVS diode, protecting a device from a transient. As shown, the protected device 100 may be any electrical device. In the embodiments shown, the protected device 100 is a data storage device, such as a hard disk drive, a network attached storage, etc.

The protected device 100 is powered by a direct current (DC) power signal 104. The DC power signal 104 may be provided by a variety of means, such as a battery, a power adapter, etc. For example, power adapters that convert alternating current (AC) power, such as from a wall outlet, to DC power are well known to those skilled in the art.

As shown, the DC power signal 104 may suffer from various transients. Such transients may be caused, for example, by power fluctuations in the AC power, component failure, lightning strikes, electrostatic discharge, and the like. These transients should ideally be suppressed or prevented in order to prevent the electronics of the protected device 100.

The protection device 102 provides a protection level to limit a transient in the power signal 104 to a certain level. In the embodiment shown, the protection device 102 is a TVS diode which is connected in parallel between the power input of the DC power signal 104 and the protected load 102. Furthermore, the protection device 102 is configured to be in removable/replaceable form. In operation, the protection device 102 will conduct current in forward biased direction, but clamp over-voltage when reversed biased. If the duration and amplitude of the current present when in this clipping mode is significant the protection device 102 may eventually short to prevent the overvoltage from damaging sensitive circuitry downstream in the protected device 100.

In contrast to the prior art, in the embodiments, to protection device 102 is not located on the circuit board of the protected device 100. Instead, the protection device 102 is implemented in removable, field replaceable, form. In these embodiments, implemented as such, TVS diodes can also be eliminated as an internal component of the power adapter for the protected device 100. By implementing the protection device in removable form, it provides transient protection while still being easily replaced if it shorts.

Furthermore, if necessary, the protection device 102 can be simply removed and the device 100 can be operated normally with the device removed. For example, the AC/DC power adapter may be configured to transition into safety mode if the output current exceeds a specified threshold beyond a minimal period of time. The adapter can remain in this safety mode indefinitely without damage until the short caused by failure of the protection device 102 is removed. At a later time, the protection device 102 may be replaced or removed so that the power adapter can return to normal operation.

In other embodiments, the protection device 102 can be implemented in standalone form, such as a clip or plug that fits on the DC plug. In this form, the protection device can be retrofitted to existing and prior products to improve their robustness to harsh power conditions.

Figure 2:
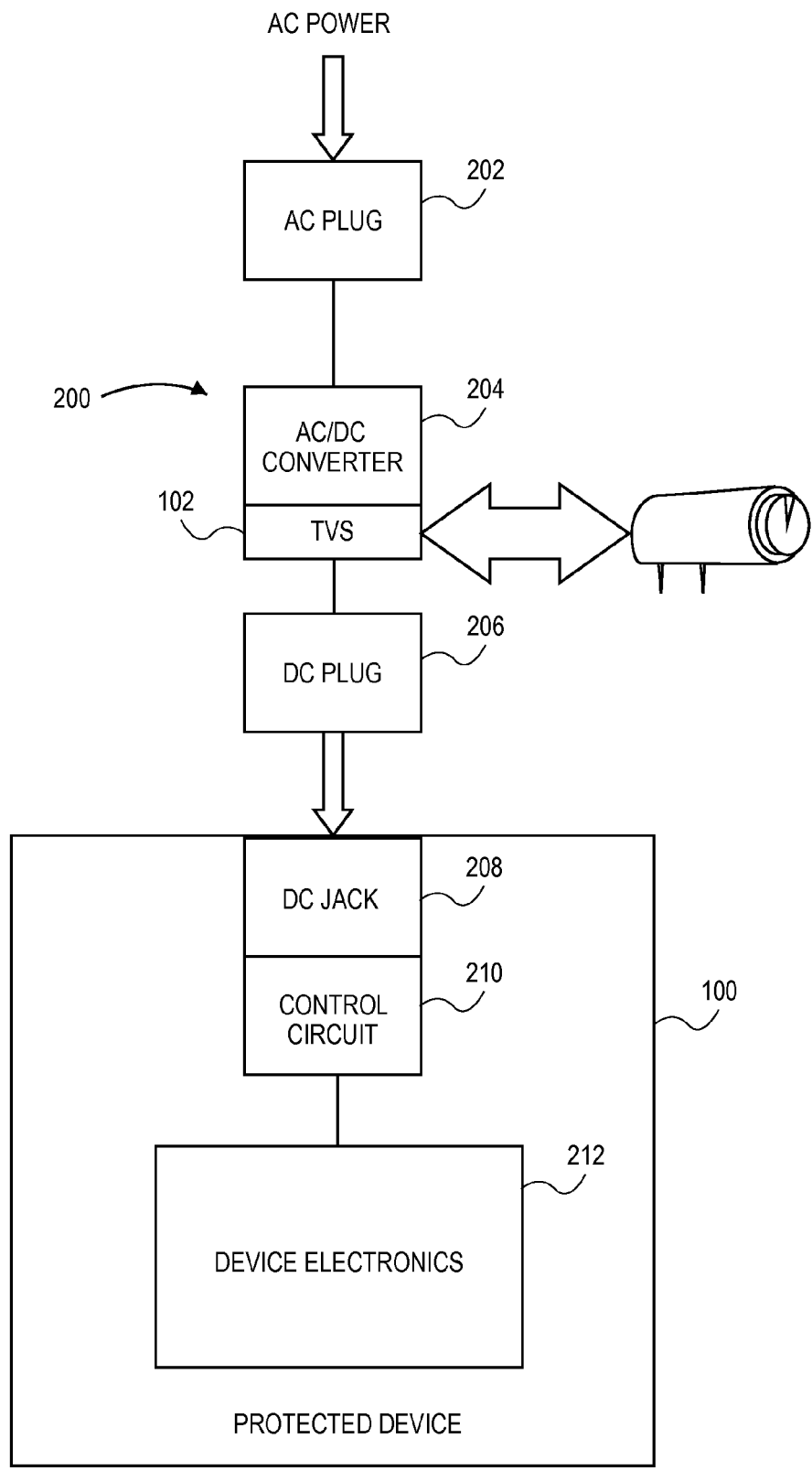
FIG. 2 shows an embodiment where a protection device is provided in removable or replaceable form on a power adapter for the protected device.

FIG. 2 shows an embodiment where a protection device is provided in removable or replaceable form on a power adapter 200 for the protected device 100. As shown, the power adapter 200 may comprise an AC plug 202, an AC/DC converter 204, and a DC plug 206. Furthermore, the protected device 100 may comprise a DC jack 208, a control circuit 210, and electronics 212.

In this embodiment, the protection device 102 is provided in removable or replaceable form on the body of the AC/DC converter 204. For example, the protection device 102 may be in a form factor similar to a fuse that can be plugged into a receptacle provided on the body of the AC/DC converter 204. This form allows the protection device 102 to be placed in an accessible location and to be easily removable.

Figure 3:
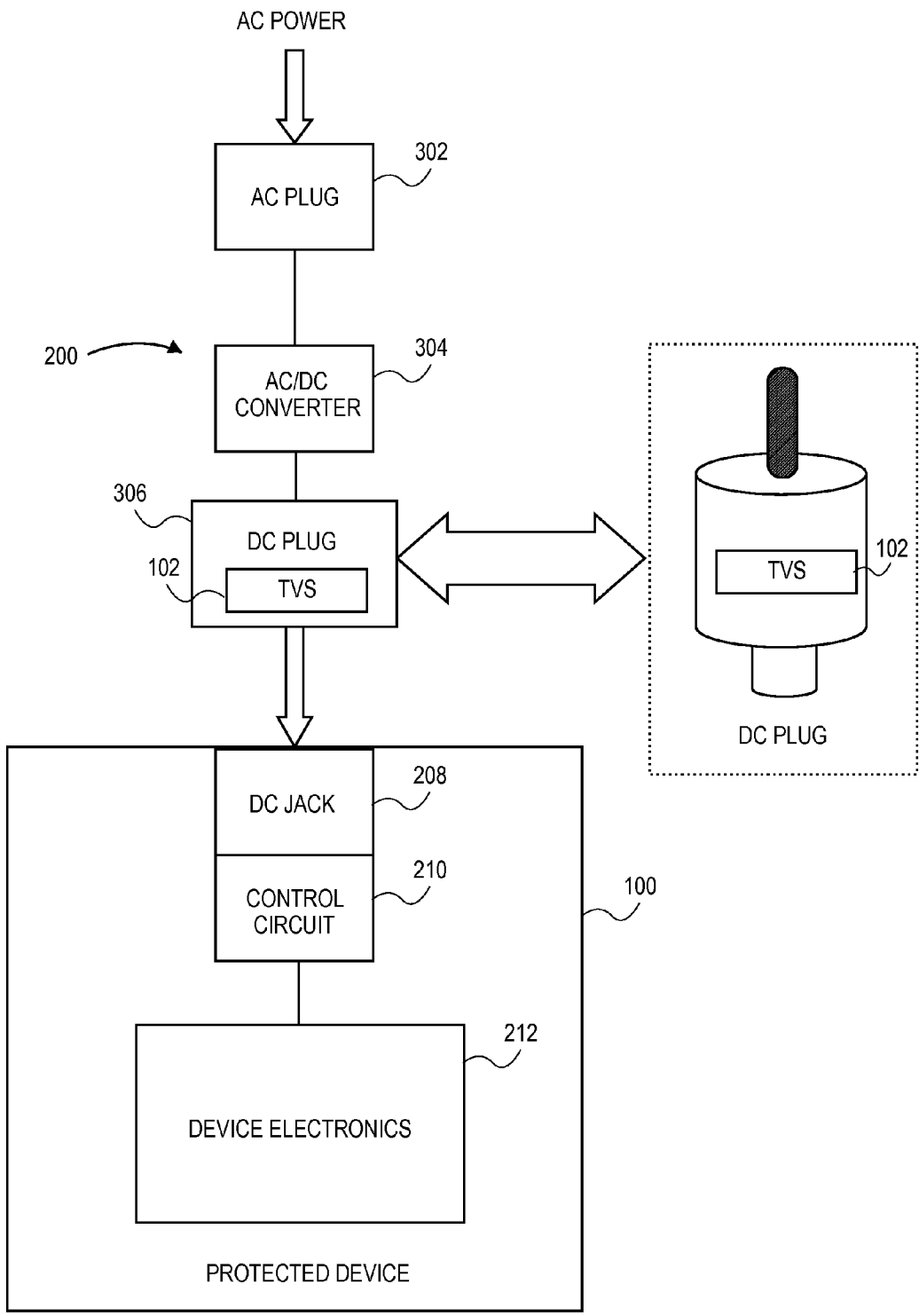
FIG. 3 shows another embodiment where the protection device is provided in removeable or replaceable form on a plug to the protected device.

FIG. 3 shows another embodiment where the protection device is provided in removeable or replaceable form on a plug to the protected device. As shown, the power adapter 300 may comprise an AC plug 302, an AC/DC converter 304, and a DC plug 306. The protected device 100 may still comprise DC jack 208, a control circuit 210, and electronics 212.

In this embodiment, the protection device 102 is provided in removable or replaceable form on the body of the DC plug 306. For example, the protection device 102 may be in a form factor similar to a fuse that can be plugged into a receptacle provided on the body of the DC plug 306.

Figure 4:
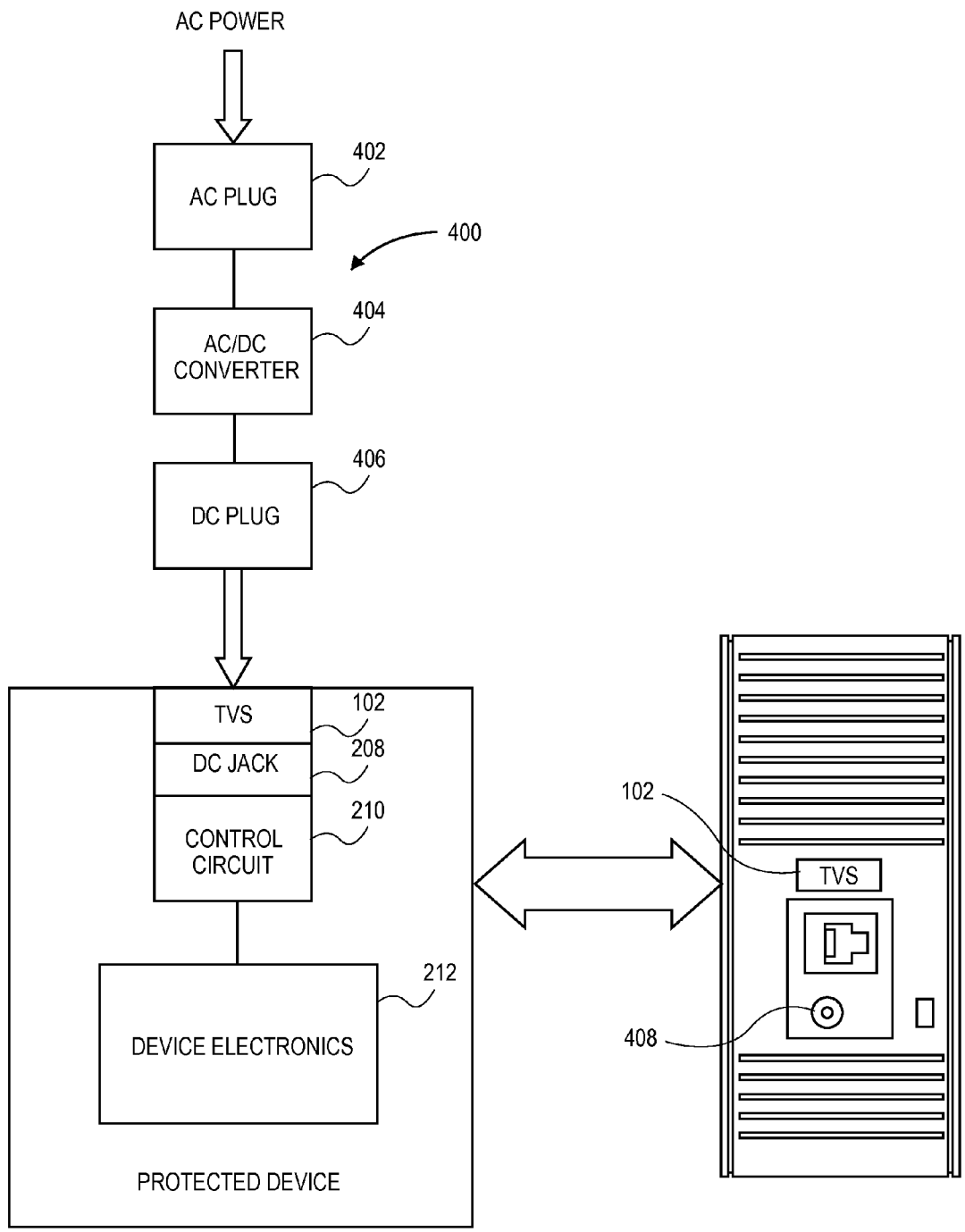
FIG. 4 shows yet another embodiment where the protection device is provided in removable or replaceable form on the casing for the protected device.

FIG. 4 shows yet another embodiment where the protection device is provided in removeable or replacable form on the casing for the protected device. As shown, the power adapter 400 may comprise an AC plug 402, an AC/DC converter 404, and a DC plug 406. The protected device 100 may still comprise DC jack 208, a control circuit 210, and electronics 212.

In this embodiment, the protection device 102 is provided in removable or replaceable form on the body of the protected device 100. As shown, the protected device 102 is provided on the casing above the DC jack 408. The protection device 102 may be in a form factor similar to a fuse that can be plugged into a receptacle provided on the body of the protected device 100.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A data storage device comprising:
    a power input configured to receive a power signal from a power source;
    a data storage medium;
    a controller, coupled to the power input, for controlling operations on the storage medium; and
    an overvoltage protection device configured to be removable from the data storage device and electrically coupled between the power input and the controller and an electrical ground.

2. The data storage device of claim 1, further comprising an enclosure having an accessible receptacle for removably securing the overvoltage protection device.

3. The data storage device of claim 2, wherein the enclosure comprises a cover for covering and protecting the overvoltage protection device while inserted in the receptacle.

4. The data storage device of claim 1, further comprising an indicator configured to indicate a failure of the overvoltage protection device.

5. The data storage device of claim 1, wherein the overvoltage protection device comprises an indicator to indicate when the overvoltage protection device has failed.

6. The data storage device of claim 1, wherein the overvoltage protection device comprises a transient suppression diode.

7. The data storage device of claim 1, wherein the power input is configured to receive a direct current power signal.

8. The data storage device of claim 1, wherein the controller is configured to control operations of the storage medium after removal of the overvoltage protection device.

9. An enclosure for an external disk drive, said enclosure comprising:
    a housing configured to enclose components of the external disk drive;
    a first receptacle for receiving a power signal from a lower source; and
    a second receptacle, in an accessible location on the enclosure, configured to removably secure an overvoltage protection device and electrically couple the overvoltage protection device between the first receptacle and an electrical ground.

10. The enclosure of claim 9, wherein the first receptacle is configured to receive a direct current power signal.

11. The enclosure of claim 9, wherein the second receptacle comprises a removable cover.

12. The enclosure of claim 9, wherein the second receptacle configured to removable secure a transient suppression diode.

13. The enclosure of claim 9, further comprising an indicator to indicate a failure of the overvoltage protection device.

14. The enclosure of claim 9, wherein the second receptacle comprises a set of slots for electrically engaging contact leads on the overvoltage protection device.

15. A method of protecting a data storage device from an overvoltage condition, said method comprising:
    receiving a power signal into the data storage device;
    providing a removable and replaceable overvoltage protection device in an accessible location on an enclosure of the data storage device, wherein the overvoltage protection device is electrically interposed between the power signal and an electrical ground, and wherein the overvoltage protection device is configured to fail as a short circuit; and
    providing, an indication indicating when the overvoltage protection device has failed and requesting removal anti replacement of the failed overvoltage protection device.

16. The method of claim 15, wherein the data storage device is configured to operate without the overvoltage protection device.

17. The method of claim 15 further comprising providing a message, by the data storage device, to a remote device when the overvoltage protection device has failed.

18. The method of claim 15, further comprising activating a second overvoltage protection device in response to the failure of the overvoltage protection device.

19. A power adapter for a data storage device, said adapter comprising:
    an alternating current power input configured to receive a power signal from a power source;
    a converter for converting the alternating current power signal into a direct current power signal;
    a plug configured to be electrically coupled to the data storage device for delivering the direct current power signal; and
    an overvoltage protection device configured to be removable from the power adapter and electrically coupled between the direct current power signal and the data storage device.

20. The power adapter of claim 19, wherein the removable overvoltage protection device is provided on an accessible location on the converter.

21. The power adapter of claim 19, wherein the removable overvoltage protection device is provided on an accessible location on the plug.

* * * * *